United States Patent

Browder

[15] 3,641,280

[45] Feb. 8, 1972

[54] APPARATUS FOR CONTACT COPYING MAGNETIC RECORDS INCLUDING SHIELD FOR PREVENTING ERASURE OF THE MASTER RECORD

[72] Inventor: Lewis B. Browder, Altadena, Calif.

[73] Assignee: Bell & Howell Company, Chicago, Ill.

[22] Filed: Jan. 19, 1970

[21] Appl. No.: 3,659

[52] U.S. Cl. ........................................................179/100.2 E

[51] Int. Cl. ..........................................................G11b 5/86

[58] Field of Search............................................179/100.2 E

[56] References Cited

UNITED STATES PATENTS 2,738,383 3/1956 Herr et al. .........................179/100.2 E

*Primary Examiner*—Bernard Konick

*Assistant Examiner*—J. Russell Goudeau

*Attorney*—Luc P. Benoit

[57] ABSTRACT

An apparatus for copying a magnetic record from a magnetic master with the assistance of anhysteretic magnetic fields includes a medium for setting up countermagnetic fields which oppose the anhysteretic magnetic fields and prevent erasure of the magnetic record.

7 Claims, 1 Drawing Figure

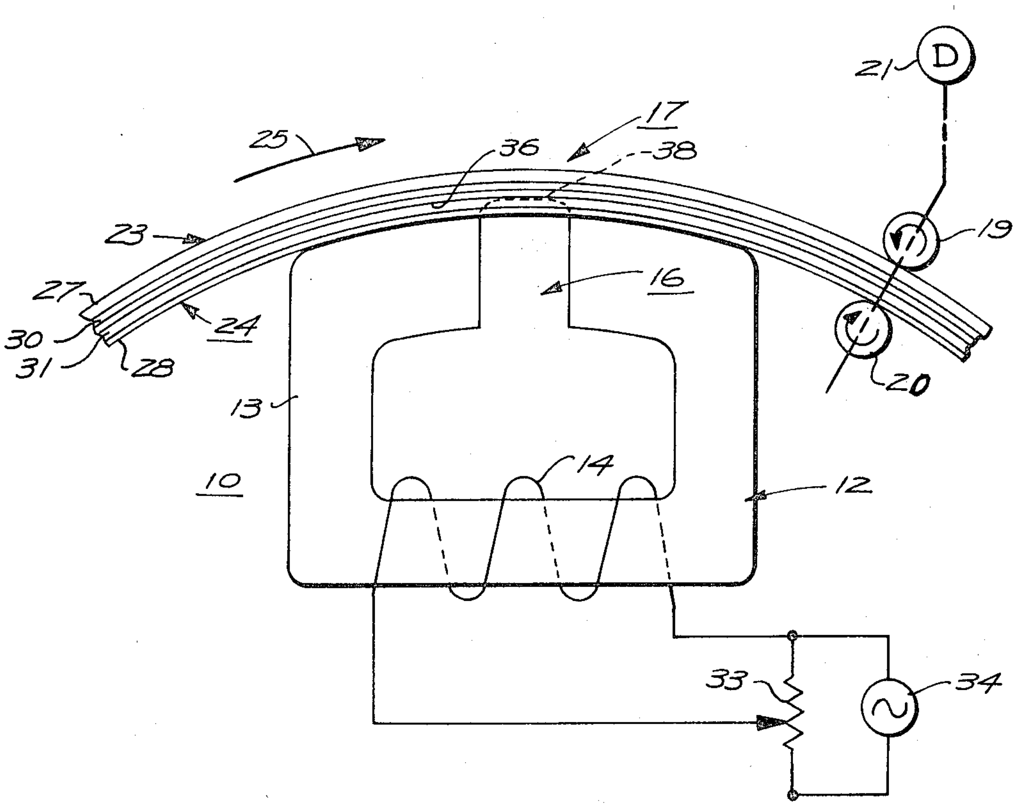
INVENTOR.
LEWIS B. BROWDER
BY [signature]
ATTORNEY

APPARATUS FOR CONTACT COPYING MAGNETIC RECORDS INCLUDING SHIELD FOR PREVENTING ERASURE OF THE MASTER RECORD

BACKGROUND OF THE INVENTION

1. Field of the Invention

The subject invention relates to the copying of magnetic records and, more particularly, to the copying of magnetic records with the assistance of anhysteretic magnetic fields.

2. Description of the Prior Art

In the late Forties the announcement of a new process for copying magnetic records with the aid of anhysteretic transfer fields received widespread attention, since the new process distinguished itself from conventional playback-and-recording techniques by such factors as simplicity of equipment, increase in operating speed, and low sensitivity to speed variations (see Camras and Herr, *Duplicating Magnetic Tape by Contact Printing*, ELECTRONICS (Dec. 1949), pp. 78–83, hereinafter cited as Camras and Herr).

In the 20 years since, the new process has not found the extent of practical application that its above-mentioned advantages would justify. The main reason therefor resides in the conflicting requirement that the magnetic master record should be difficult to erase, while the magnetic copy medium should be easy to magnetize.

By way of example, if the master medium, on which the magnetic record to be copied is located, has the same coercivity as the magnetic copy medium, then a magnetic transfer field that is strong enough to cause recordwise magnetization of the copy medium will partially erase from the master the very record it is supposed to copy. It has, therefore, been predicted from the beginning that copying from one magnetic recording tape to another identical tape will never be wholly satisfactory with the new process (see Camras and Herr, p. 83, paragraph bridging first and second columns).

Accordingly, master media with substantially higher coercivities than the copy media have been preferred in anhysteretic transfer field copying processes. This, however, has impaired the widespread utilization of this process, since master media with high coercivities are difficult to record on, while the quality of magnetic records on copy media with low coercivities is easily affected by such factors as temperature and environmental magnetic fields.

SUMMARY OF THE INVENTION

The subject invention overcomes or materially alleviates the above-mentioned disadvantages and resides in apparatus for copying magnetic records from a first magnetic recording medium, comprising in combination means for providing anhysteretic magnetic fields tending to at least partially erase said magnetic records, a second magnetic recording medium exposed to said magnetic records and to said anhysteretic magnetic fields and susceptible to substantially linear magnetization by said magnetic records under the influence of said anhysteretic magnetic fields, and means operatively associated with said first magnetic recording medium for opposing penetration of said first magnetic recording medium by said anhysteretic magnetic fields whereby to prevent erasure of said magnetic records.

In a preferred embodiment of the invention, the means for opposing the above-mentioned penetration include means for providing counter magnetic fields at the first recording medium which oppose the imposed anhysteretic fields. By way of example, the means just mentioned may include an electrically conductive layer which is operatively associated with the first recording medium and in which eddy currents are induced by the imposed anhysteretic fields.

BRIEF DESCRIPTION OF THE DRAWING

The invention will be more readily apparent from the following detailed description of preferred embodiments thereof, illustrated by way of example in the accompanying drawing in which the single figure is a side view of a magnetic record copying apparatus embodying the subject invention.

DESCRIPTION OF PREFERRED EMBODIMENTS

The illustrated magnetic record-copying apparatus 10 includes a magnetic head 12 composed of a magnetic core 13 and an electromagnetic winding 14. The core 13 defines an airgap 16 at a copying zone 17.

A pair of capstans 19 and 20 are rotated in synchronism by a conventional drive 21 and advance a master tape 23 and a copy tape 24 without mutual slippage in the direction of arrow 25 through the copying zone 17.

The master and copy tapes 23 and 24 have tape substrates 27 and 28 of a type conventionally used in magnetic recording tapes. A layer of a first magnetic recording medium 30 is located on the master tape substrate 27 and a layer of a second magnetic-recording medium 31 is located on the copy tape substrate 28.

The magnetic-recording media 30 and 31 may be of a conventional type. By way of example, the magnetic-recording media 30 and 31 may be of the gamma ferric oxide type, or of another iron-oxide type conventionally used in magnetic recording, or may be of the chromium dioxide type (see U.S. Pat. No. 3,364,496, by Greiner et al., issued Jan. 16, 1968, and British Patent No. 1,139,232, by E. I. duPont de Nemours and Company, published Jan. 8, 1969).

The electromagnetic winding 14 of the head 12 is energized from a potentiometer 33 which is connected to a source 34 of electrical high frequency current.

The source 34 is dimensioned and the potentiometer 33 adjusted so that an alternating magnetic field is established at the airgap 16 of a peak amplitude sufficient to subject the copy medium 31 to an idealizing process of the type described in the above-mentioned Camras and Herr article, whereby magnetic records contained on the master tape 23 are copied on the copy tape. The requisite decaying nature or anhysteretic characteristic of the alternating magnetic field is provided by virtue of the fact that the media 30 and 31 travel relative to the airgap 16 of copying zone 17. In this manner each element of the copy medium 31 experiences a decaying magnetic field as it travels away from the airgap 16.

The peak amplitude of the alternating magnetic fields at the airgap 16 relative to the copy medium 31 is such that the copy medium 31 is susceptible to linear magnetization by the magnetic master records on the master tape 23, when exposed to both these magnetic master records and the anhysteretic magnetic fields just mentioned. To provide in this manner a magnetic copy that is not subject to objectionable deterioration by common temperature fluctuations or environmental magnetic fields, it is necessary that the copy medium 31 have a sensibly high coercivity which calls for an adequately high-peak amplitude of the anhysteretic magnetic field provided by the head 12.

The latter requirement, in turn, dictates a yet higher coercivity of the master medium 30 in prior art processes, since anhysteretic copy fields that are strong enough to overcome the coercivity of the copy medium also tend to erase at least partially the magnetic records on the master tape 23. The coercivity of the master medium 30 is, however, subject to the restriction that this coercivity must be sensibly low to permit a magnetic recording of information on the master tape.

According to the preferred embodiment illustrated in the drawing, a layer 36 of electrically conducting material is operatively associated with the magnetic master medium 30. The alternating magnetic fields provided by the magnetic head 12 induce electric eddy currents in the electrically conducting layer 36, and these eddy currents, in turn, produce counter magnetic fields which oppose penetration of the master medium 30 by the alternating magnetic fields provided by the magnetic head 12.

To promote eddy current induction, the layer 36 is preferably of silver, gold or aluminum, which are materials of high electrical conductivity. While conductivity is also a function of layer thickness, an increase in thickness of the layer 36 leads to an impairment of the copying process, especially at higher signal frequencies, if the layer 36 is interposed between the master and copy media 30 and 31 as shown in the illustrated embodiment. By way of example, however, a layer thickness of the order of about 5 microinches still leads only to a dropoff between master and copy of some 6 decibels for signals in the megacycle range recorded at a recording speed of about 700 inches per second.

The layer 36 may be deposited on the master medium 30 or on the copy medium 31, and it should be understood in this connection that the statement herein employed according to which the layer is operatively associated with the master recording medium refers to the shielding function of the layer and not necessarily to its physical location. Accordingly, the layer 36 may, for instance, be deposited on the master medium 30 or on the copy medium 31 by sputtering, plating or spraying.

The frequency of the alternating magnetic field provided by the magnetic head 12 is preferably in the 100 kilohertz or in the megahertz range, so as to promote the generation of eddy currents and counter magnetic fields in the conductive layer 36.

While the layer 36 shields the master medium 30 against the alternating magnetic fields provided by the magnetic head 12, as indicated by the illustrated course of the dotted line 38, it permits magnetic flux from the magnetic records on the master tape to pass to the copy medium. The reason for this phenomenon lies in the fact that the magnetic flux of the master records is always stationary relative to the conductive layer 36, even if such master records represent high frequency signals.

Deposition of the conductive layer 36 on the copy medium 31 is preferred in those cases in which the copy tape 24 serves as a master in a subsequent copying process. This is, for instance, often the case in the duplication of transverse-scan or slant-track video signal recordings in which a first duplication process results in the production of a mirror-image copy which is converted into a right-reading copy by a second duplication process.

By way of example, this may be applied as follows to the illustrated embodiment:

The video signal is first magnetically recorded on the master tape 23, with the conductive layer 36 being provided on the copy tape 24. The recorded video signal is thereupon copied on the copy tape 24 by means of the process illustrated in the drawing. The copy tape 24 is then employed as a master in a further copying process in which the magnetic record copied on the tape 24 is recopied on a further magnetic recording tape, also in the manner illustrated in the drawing.

If this copying and recopying processes were effected in accordance with prior art technique, serious drawbacks would result. The coercivity of the initial master tape would either have to be higher than practical for the original recording of the signal, or the coercivity of the ultimate copy tape would become lower than practical for the provision of a durable record. This is the case because prior art technique as mentioned above requires that the magnetic medium serving as the master in the particular copying step have a higher coercivity than the magnetic medium serving as copy medium in that step.

With the shielding means according to the subject invention, the master medium in the first copying step may have a lower coercivity than would be required in the absence of the shielding means, and the ultimate copy medium in the second copying step may have a higher coercivity than would be possible in the absence of the shielding means.

It will now be appreciated that the subject invention solves a problem that has impeded the utilization of a needed and basically outstanding technique for two decades.

I claim:

1. Apparatus for copying magnetic records from a first magnetic recording medium, comprising in combination:

means for providing anhysteretic magnetic fields tending to at least partially erase said magnetic records;

a second magnetic recording medium exposed to said magnetic records and to said anhysteretic magnetic fields and susceptible to substantially linear magnetization by said magnetic records under the influence of said anhysteretic magnetic fields; and means operatively associated with said first magnetic recording medium for opposing penetration of said first magnetic recording medium by said anhysteretic magnetic fields whereby to prevent erasure of said magnetic records.

2. Apparatus as claimed in claim 1, wherein:

said means for opposing said penetration include means for providing counter magnetic fields at said first recording medium which oppose said anhysteretic magnetic fields.

3. Apparatus as claimed in claim 1, wherein:

said means for opposing said penetration include means for providing eddy currents in response to said anhysteretic magnetic fields.

4. Apparatus as claimed in claim 1, wherein:

said means for opposing said penetration include an electrically conductive layer operatively associated with said first magnetic recording medium.

5. Apparatus as claimed in claim 1, wherein:

said means for opposing said penetration include an electrically conductive layer interposed between said first and second magnetic recording media.

6. Apparatus as claimed in claim 1, wherein:

said means for opposing said penetration include an electrically conductive layer deposited on said first magnetic recording medium.

7. Apparatus as claimed in claim 1, wherein:

said means for opposing said penetration include an electrically conductive layer deposited on said second magnetic recording medium.

* * * * *